United States Patent [19]
Kleinschmidt

[11] 4,376,255
[45] Mar. 8, 1983

[54] METHOD FOR PULSE TRIGGERING OF A PIEZO-ELECTRIC SOUND-TRANSMITTING TRANSDUCER

[75] Inventor: Peter Kleinschmidt, Munich, Fed. Rep. of Germany

[73] Assignee: Siemens Aktiengesellschaft, Berlin & Munich, Fed. Rep. of Germany

[21] Appl. No.: 235,653

[22] Filed: Feb. 18, 1981

[30] Foreign Application Priority Data

Mar. 14, 1980 [DE] Fed. Rep. of Germany ....... 3009975

[51] Int. Cl.³ .......................................... H01L 41/08
[52] U.S. Cl. .................................... 310/317; 310/316
[58] Field of Search ..................... 310/316, 317, 314; 73/632, 598, 596, 609, 620, 627, 629; 340/384 E

[56] References Cited

U.S. PATENT DOCUMENTS

| | | | |
|---|---|---|---|
| 2,398,701 | 4/1946 | Firestone | 310/317 X |
| 2,651,012 | 9/1953 | Valkenburg et al. | 310/317 X |
| 2,949,028 | 8/1960 | Joy | 310/317 X |
| 3,828,357 | 8/1974 | Koeblitz | 310/317 X |
| 4,195,243 | 3/1980 | Thaxter | 310/317 |
| 4,282,452 | 8/1981 | Hassler et al. | 310/317 |

Primary Examiner—Mark O. Budd
Attorney, Agent, or Firm—Hill, Van Santen, Steadman, Chiara & Simpson

[57] ABSTRACT

A piezoelectric ultrasonic transducer is triggered by a predeflection of the transducer in a first direction with a square-wave pulse or a saw-tooth pulse which has a rapidly dropping trailing edge to effect deflection in the opposite direction, with an overshoot. At the maximum point of overshoot, an alternating triggering voltage, preferably in the form of a pulse sequence, is applied to energize and maintain the transducer in resonance oscillation.

8 Claims, 11 Drawing Figures

METHOD FOR PULSE TRIGGERING OF A PIEZO-ELECTRIC SOUND-TRANSMITTING TRANSDUCER

BACKGROUND OF THE INVENTION

1. Field of the Invention

The present invention relates to a method for pulsewise transmission triggering of a piezoelectric sound transducer with a definable pulse time and which is to be carried out with an electrical alternating voltage having a frequency which is equal to the self-resonance of the transducer.

2. Description of the Prior Art

It is known from the prior art to use this general technique from a pulse signal for distance measurements. For this purpose, short ultrasonic pulses are transmitted and the echo signal is received and evaluated. The distance of an object reflecting the ultrasonic pulses results from the transit time of the ultrasonic waves.

In the case of short distances, whereby the transit time is no longer greater by at least an order or magnitude than the pulse duration of the ultrasonic signal of the piezoelectric transducer, difficulties result for an accurate determination of the transit time, since the incipient time of the transmitted sound pulse cannot be determined with any type of random accuracy.

Previously, this problem was solved by using special evaluating methods. If the function of the initial sounding of the ultrasonic pulse is known, then by mathematical extrapolation of the envelope of the received signal, the beginning of the echo can be determined subsequently somewhat precisely. This method of a backward extrapolation, however, presumes the storage of the received signal and is thus expensive at the outset.

SUMMARY OF THE INVENTION

It is the object of the present invention, with respect to the operation of the piezoelectric ultrasonic transducer, in particular as a transmitting transducer for particularly short distances, to provide an operating method with which the incipient time of the transmitted sound pulse is precisely determined in a simple manner.

This object is achieved, according to the present invention, in a first embodiment in that for the attainment of a mechanical initial oscillation of the transducer which is essentially already equal to the full amplitude of the built-up state, a direct voltage is temporarily applied to the transducer, in particular with a rapid voltage drop at the transducer which occurs after a voltage rise. The voltage drop occurs in an interval of time $\Delta t < \tau/2$, where $\tau$ is the period of the triggering alternating voltage and the beginning of the voltage drop lies at least almost at the point in time of half a period $\tau/2$ before the point in time of the rise of the amplitude of the triggering alternating voltage, and with at least almost such an amplitude of the direct voltage at the transducer with which the transducer receives an amplitude of the mechanical deflection which is of the oscillation amplitude of the built-up alternating voltage triggering state.

In another embodiment, for the attainment of a mechanical initial oscillation of the transducer, which already is essentially equal to the full amplitude of the built-up state, a direct voltage pulse is temporarily applied to the sound transducer and is provided specifically with a rapid voltage rise and a rapid voltage drop at the transducer. The voltage rise and the voltage drop occur in each case in an interval of time $\Delta t < \tau/2$, wherein is the period of the triggering alternating voltage. The beginning of the voltage drop lies at least almost at the point in time of half a period before the point in time of the rise of the amplitude of the triggering alternating voltage and the pulse width amounts to at least almost $\tau/2$, and with at least almost such an amplitude of the direct voltage pulse at the transducer with which the transducer receives an amplitude of the mechanical deflection, which is of the oscillating amplitude of the built-up alternating voltage triggering state.

The present invention proceeds from the knowledge that an ultrasonic transducer, which is operated at its resonant frequency, may be operated without endangering its mechanical stability only with an alternating voltage which is limited in amplitude. With connection of this alternating voltage, the oscillation amplitude of the transducer arises, however, only with a time constant $\theta$ which depends upon the resonant grade (Q value) of the transducer corresponding to the relationship $$\theta = Q_m \cdot \tau$$

from an initial value $A_1 = A_{max}/Q_m$ to the final value $A_{max}$, which, for example, is the maximum allowable mechanical amplitude of the appertaining transducer.

The invention is based upon the recognition that a piezoceramic transducer with which triggering can be operated in series resonance without danger only with an alternating voltage having a peak value of $U_{max}$ at the most, on the other hand, can be triggered without damage with a one-time voltage jump which amounts to a multiple of the peak value $U_{max}$. The voltage of this voltage jump may thereby automatically be selected to be so high that already with this one-time electrical triggering of the transducer, a mechanical deflection amplitude $A_{max}$ is attained which is equal to the maximally allowable mechanical oscillation amplitude of the transducer, and can be generated maximally in resonance with alternating voltage triggering, or respectively, periodic pulse triggering having a peak value $U_{max}$ after completion of the build-up process.

According to the principle of the invention, the admission of this transducer, preceding the triggering of the transducer with an alternating voltage, or respectively, pulse sequence, is provided with a direct voltage having a sudden direct voltage drop. According to the collateral solutions of this principle, this direct voltage to be applied to the transducer can be a voltage rise in the nature of a sawtooth pulse, then have a rapid voltage drop. The voltage rise in no way needs to be linear; it must only be assured that the mechanical deflection of the transducer can follow the electrical voltage rise so that the maximum of the mechanical deflection occurring through the application of the direct voltage corresponds to the maximum of the applied voltage. The other collateral solution is to use, as a direct voltage to be applied, a square-wave pulse having a pulse width $\tau/2$, where $\tau$ is the period of the alternating voltage, or respectively, periodic pulse sequence of the transmitting operation which is to be subsequently switched on. In the case of both solutions, a relatively rapid voltage drop is to be provided within a period of $\Delta t < \tau/2$, whereby the center of this time interval $\Delta t$, that is, the point in time of the rapid voltage drop (the saw-tooth pulse of the one solution and the square-wave pulse of the other solution) lies a half period, namely, $\tau/2$, before the point in time of the rise of the amplitude of the triggering alternating voltage, or respectively, of the periodic pulse sequence.

For the first of the collateral alternatives, for the saw-tooth pulse, a $U_{max}=U_o$ value is to be provided, where $U_o$ is that voltage value at which the transducer attains its maximally allowable mechanical deflection (in the direct current case). In the case of the second alternative, the maximum possible amplitude $U_{max}$ of the square-wave pulse is equal to $U_o/2$. The latter is based upon the fact that in the case of the direct current triggering with a square-wave pulse of the kind mentioned above (preceding the actual alternating voltage triggering according to the invention), a 100% overshot of the mechanical transducer occurs, in particular to the same high amplitude as in the case of the first alternative.

It should be mentioned, for the sake of completeness, that also lower maximum voltages are possible for the direct voltage of the first alternative and the square-wave pulse of the second alternative (preferably in the case of also a lower alternating voltage amplitude of the actual transmitting operation) if one is satisfied with a lower sound transmitting power than the transducer which is used in each case as actually capable of providing.

The transmission triggering of the transducer with the alternating voltage, or respectively, with the periodic pulse sequence, proceeds as is known on one of the subresonances of the transducer, whereby for this purpose, as a rule, the self-resonance is drawn upon which has the largest transmitting effect.

According to the invention, therefore, in the case of both alternatives, with the help of the direct voltage which is applied ahead of time, a mechanical deflection of the transducer is generated which is at least almost as large as the oscillation deflection of the transducer in the built-up or steady-state. The direct voltage, with respect to the mechanical rest position (without applied voltage) of the transducer leads to a deflection in one direction (in contrast to the deflection in two directions in the transmitting, oscillating state). Electrically, according to the invention, the application of a direct voltage to the transducer acts as a charging of the essentially electrical capacitance of the transducer, and specifically by way of the unavoidable resistance of the voltage source. The amplitude (maximum allowable) of the direct voltage to be applied is, in the case of the alternative of the saw-tooth pulse, equal to $U_o$ and in the case of the alternative of the square-wave pulse is equal to $U_o/2$, as was set forth above. The following relationship applies $$U_o = Q_m \cdot U_1,$$

where $U_1$ is the maximum from negative to positive peak value of the triggering transmitting alternating voltage, or respectively, the overall pulse height of the triggering periodic transmitting pulse sequence. To the extent that these values are not determined by computation, the same can be determined experimentally for any type of transducer. Selecting the direct voltage to be applied, according to the invention, smaller than $U_o$, particularly in the case of the use of the square-wave pulse with only a $U_o/2$ direct voltage to be applied, is recommended in cases in which the electrical breakdown voltage of the piezoelectric material of the transducer should be exceeded with the value $U_o$. The rapid damping of the direct voltage to be applied, according to the invention, can be brought about with the help of electrical short circuiting of the electrodes of the transducer with one another. This short circuit, as a maximum, lasts a half resonance oscillation period $\tau/2$ of the following alternating voltage triggering.

The special quality of the measure of the present invention of the rapid voltage drop, for example, of the electrical short circuiting of the transducer, is that same leads not only to a return of the deflection of the transducer from its rest position which was brought about with the direct voltage, but also leads to a mechanical overshoot and specifically with the frequency of the self-resonance of the transducer. The electrical triggering alternating voltage of the transmitting operation, with regard to its phase relationship, in accordance with this is switched on, accommodated in such a manner that the mechanical overshoot mentioned above and the following periodic mechanical oscillation triggering by the triggering alternating voltage of the transmitting operation, are at least to a large extent in proper phase relation; this means that the triggering alternating voltage, or respectively, the periodic pulse sequence, must start with a specified phase as stated.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 5 is a schematic circuit diagram of an embodiment of the invention operating in accordance with the square-wave principle, while

DESCRIPTION OF THE PREFERRED EMBODIMENTS

Figure 1:
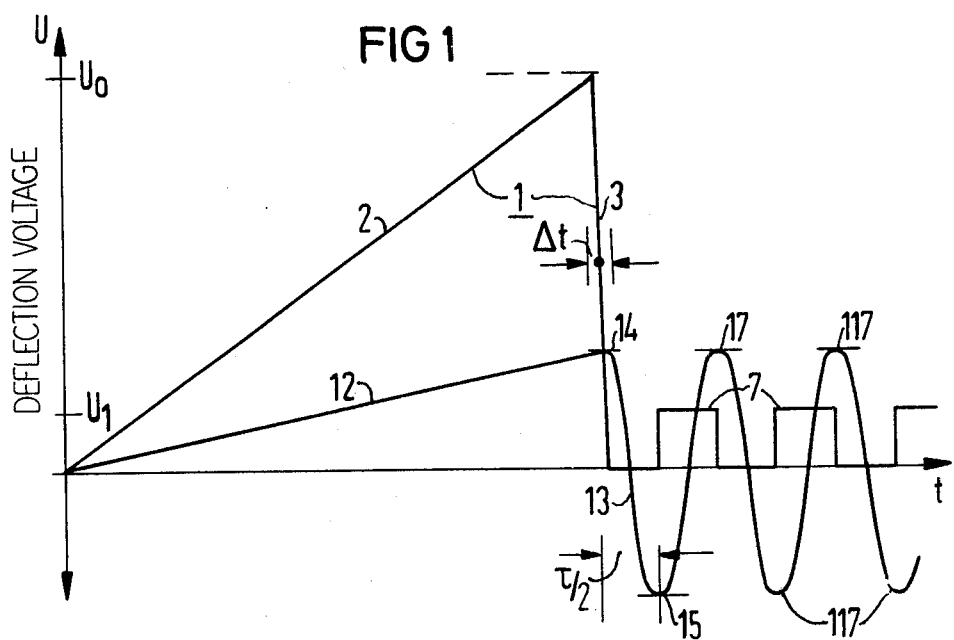
FIG. 1 is a graphic illustration of the direct voltages to be applied according to the invention utilizing a saw-tooth pulse.

In FIG. 1, a saw-tooth pulse 1 is illustrated having a rise 2 and a rapid drop 3 which is essential to the invention and, moreover, the shape of the time-related slope of the rise is of subordinate significance (as long as the deflection maximum is, in fact, attained at least to a large extent). With the pulse 1, a practically complete mechanical deflection of the transducer is attained. A curve 12 illustrates the mechanical deflection associated with the voltage rise 2 up to the value of the maximum deflection 14. The rapid voltage drop 3 leads to the return of the deflection along a path 13 with a following overshoot proceeding in the opposite direction up to the amplitude 15. The amplitude 15, calculated from the voltage drop 3, is attained after a time $\tau/2$ where $\tau$ is the above-mentioned period of the self-resonance of the transducer and that of the triggering alternating voltage 7. It is optimal to let the triggering alternating voltage 7 start at the transducer precisely at the time of attaining the amplitude 15. In FIG. 1, this triggering alternating voltage 7 is a periodic pulse sequence, as mentioned above. The available pulse sequence 7 causes the mechanical oscillations of the transducer which are represented with the amplitudes 17 and 117, namely with the initial amplitude 17, which is attained according to the present invention. The representation of FIG. 1 contains the optimum phase relationships for the invention of the triggering alternating voltage 7 and the mechanical oscillation deflection 17, 117 of the transducer.

Figure 2:
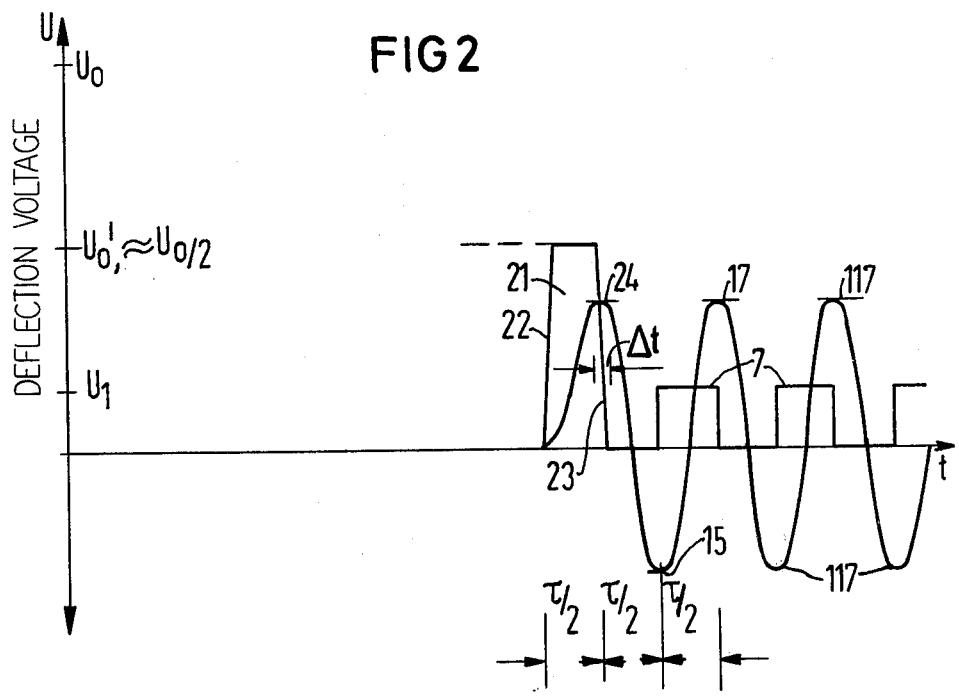
FIG. 2 is a graphic illustration similar to FIG. 1 in which the initial deflection is effected by a square-wave pulse.

FIG. 2 illustrates a square-wave pulse 21 which has a rapid rise 22 in comparison to FIG. 1. However, according to the invention, the rapid voltage drop 23 is important which, just in the case of the example of FIG. 1, occurs at a time $\tau/2$ before the starting of the alternating voltage 7. The pulse width of the pulse 21 amounts to at least almost $\tau/2$. As was already explained above, for the square-wave pulse 21, an amplitude $U'_o \approx U_o/2$ is to be provided, which as a result of the overshoot, brings the transducer to an initial amplitude 24 which is practically the same height as the amplitude 14 of FIG. 1. Corresponding to the square-wave pulse 21, there results an initial rise 12' of the mechanical deflection which at first to a large extent is non-sinusoidal.

With respect to further details of the invention, reference should be taken back to FIGS. 1 and 2 during the following discussions.

Figure 3:
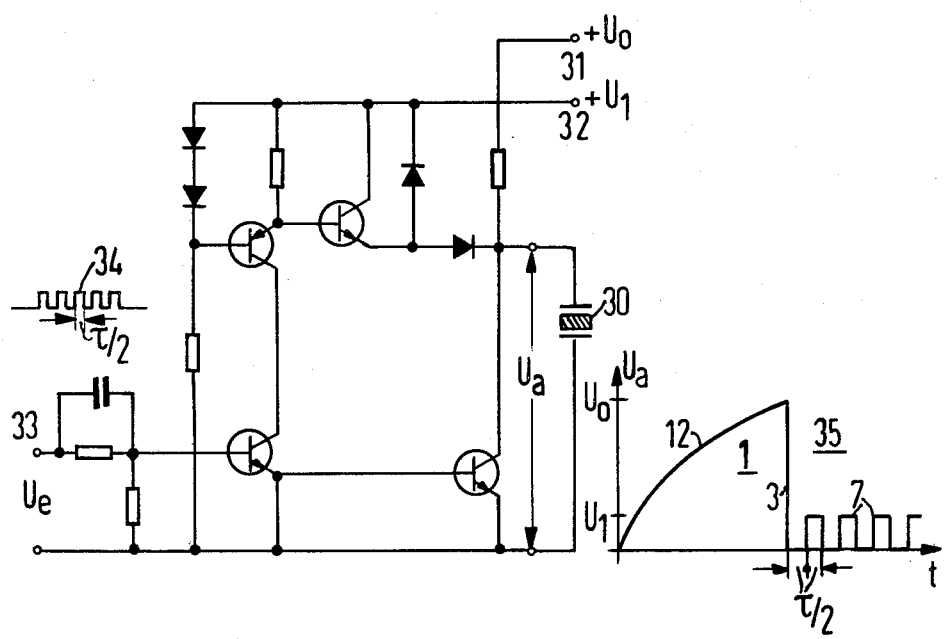
FIG. 3 is a schematic circuit diagram of an embodiment of the invention operating on the saw-tooth principle.

FIG. 3 illustrates an electronic circuit for an ultrasonic transducer 30 which operates without a transformer. At a terminal 31, the transducer is connected, via a resistor, to a direct voltage $+U_o$ of the direct voltage which is to be provided according to the invention. At a terminal 32, the operating voltage $U_1$ is provided for the actual triggering circuit. The voltage amplitude $U_1$ is equal to the peak value of the above-mentioned periodic triggering alternating voltage 7 at the converter 30. The direct voltage $U_o$ at the terminal 31 is, according to the invention, very much larger than the voltage amplitude $U_1$, preferably in accordance with the relationship $$U_o = Q_m \cdot U_1$$

where $Q_m$ is the type-conditioned mechanical operating Q value of the transducer 30, as mentioned above. At an input terminal 33, the input of the circuit is provided with a clock pulse signal 34 after the triggering frequency.

The remaining elements of the circuit according to FIG. 3 are shown in such a manner which is completely understandable for one skilled in the art with internationally known symbols. At 35, the voltage-time diagram of the overall voltage $U_a$ at the transducer 30 is illustrated, whereby an operation according to FIG. 1 results. Basically, the upper transistors provide for charging, while the lower transistors, in particular the right-hand transistor, provides the short circuiting of the transducer to provide the voltage drop 3.

Figure 4:
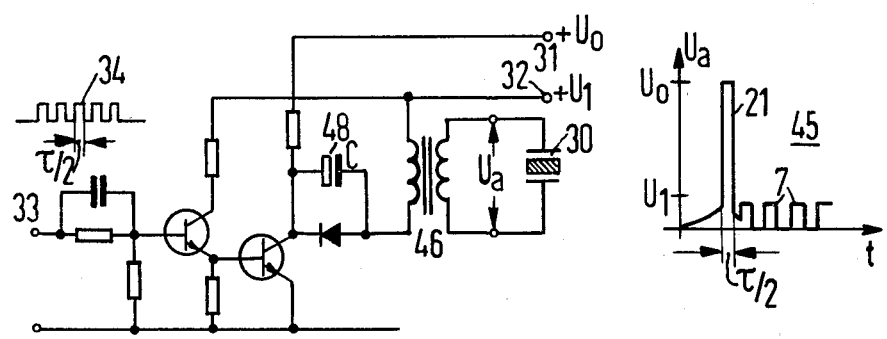
FIG. 4 is a schematic circuit diagram of an embodiment of the invention operating in accordance with the square-wave principle.

In FIG. 4, a second triggering circuit is illustrates which has a transformer 46 for the transducer 30. Instead of the transducer capacitance, here an auxiliary capacitor 48 is charged to the operating voltage $U_o'$ which is raised by the value $\frac{1}{2}Q_m$. The other details of FIG. 4 are similar to those of FIG. 3. A pulse diagram 45 illustrates the voltage-time conditions for the voltage at the transducer 30. With the operation of the circuit according to FIG. 4, corresponding to the variation according to FIG. 2, a direct voltage square-wave pulse 21 is generated which is transferred by way of the pulse transformer 46 to the transducer 30.

Figure 5:
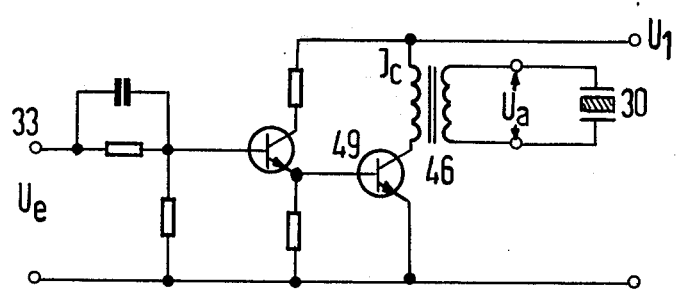

FIG. 5 illustrates a further triggering circuit operating in accordance with the saw-tooth principle of FIG. 1. The voltage $U'_o$ for the direct voltage pulse provided according to the invention, which with respect to the operating voltage $U_1$ is larger by the factor $\frac{1}{2}Q_m$, is obtained from the magnetic energy which is stored in the inductance of the transformer 46. For this purpose, the transformer 46 is dimensioned with respect to its inductance such that its magnetic core, with the application of the operating voltage $U_1$, does not yet come into saturation, or is just at the point of coming into saturation, after an interval of $$\theta = \tfrac{1}{2} Q_m \cdot \tau$$

If the transformer 46 is severed from the operating voltage by the transistor 49, which operates as a switch, then the surge exceeding the peak value of the operating current by the factor $Q_m$ flows into the transducer 30 and with this brings about the direct voltage triggering $U'_o$ in accordance with the invention which precedes the working alternating voltage triggering with the result of an immediate full amplitude 14 (FIG. 1) of the mechanical deflection. This deflection, as in the case of the preceding examples, then changes into the resonant oscillation deflection of the full oscillation amplitude 17, 117.

Figure 5A:
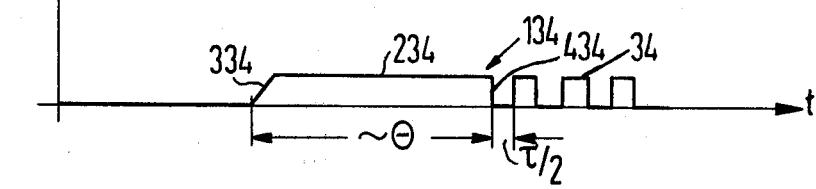
FIGS. 5a–5c illustrate voltage and current pulses which appear during the operation of the circuit of FIG. 5.

For the circuit according to FIG. 5, FIG. 5a illustrates the control voltage 134 which is applied to the input 33, the control voltage comprising a square-wave pulse portion 34 as in the case of the circuits of FIGS. 3 and 4 and further portions 234, 334. After a slow rise 334 in comparison to the square-wave signal 34, there follows a pulse portion 234 with a constant amplitude which, at the time of the desired voltage drop 3, has a corresponding drop 434 which is followed by the pulses 34.

Figure 5B:
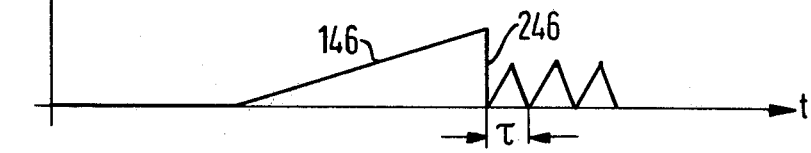
Figure 5C:
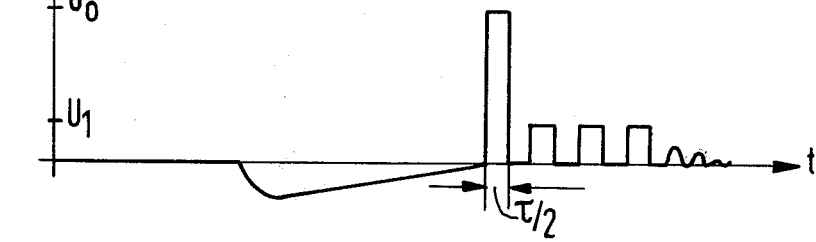

FIG. 5b illustrates the current $I_C$ on the ordinate which is applied via the transistor 49 through the primary winding of the transformer 46. A pre-saturation rise 146 of the magnetic core of the transformer 46 corresponds to the portion 234 and 334 of the control voltage according to FIG. 5a. At 246, a rapid drop of the current $I_C$ is illustrated, which then changes into a triangular current series having a period. $\tau$ FIG. 5c, for the FIGS. 5a and 5b, illustrates the electrical voltage at the transducer 30 over a time interval with the square-wave pulse 57 as the direct voltage pulse 21, which is to be applied temporarily according to the invention, and it illustrates the pulse sequence 55 corresponding to the alternating voltage triggering 7.

Figure 6:
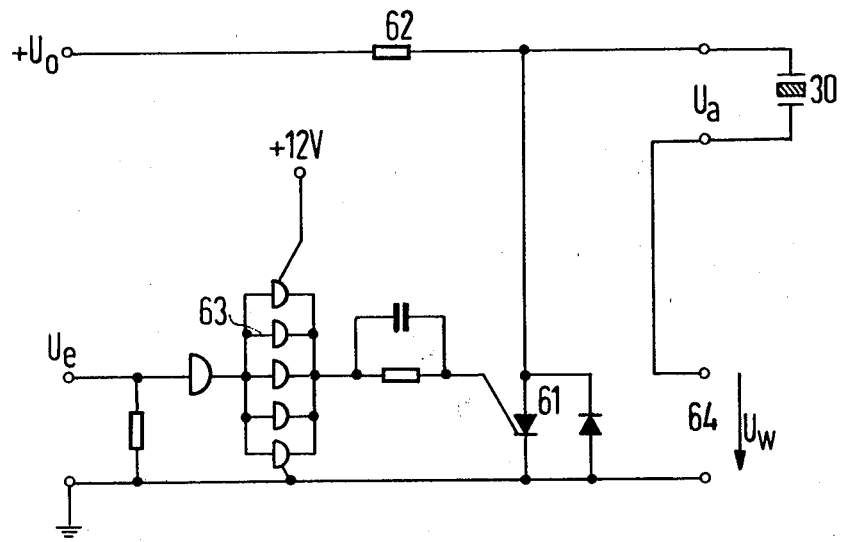
FIG. 6 is a schematic circuit diagram of an embodiment of the invention operating in accordance with the saw-tooth principle, with FIGS. 6a and 6b illustrating voltages at various points in the circuit of FIG. 6.
Figure 6A:
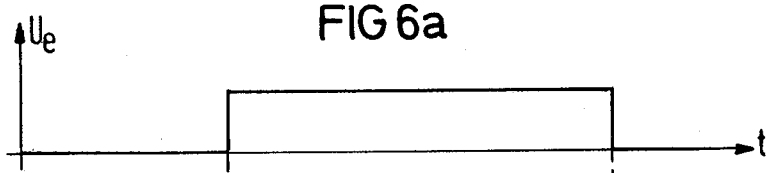

FIG. 6 illustrates another embodiment which operates in accordance with the principles of FIG. 1, namely the saw-tooth principle. A thyristor 61 is providing for controlling short-circuiting to generate the rapid voltage drop 3. With the applied voltage $U_o$ the electrical capacitance of the transducer 30 is charged via the additional resistor 62 up to the direct voltage. At the moment of the beginning of a voltage jump $U_e$ at the input 65 (FIG. 6a), via a gate circuit 63 (for example, a CD 4009), the driving of the thyristor 61 (for example a BBC Type C5-12902) occurs. The voltage drop 3 which was already mentioned takes place at a magnitude $U_o$.

Figure 6B:
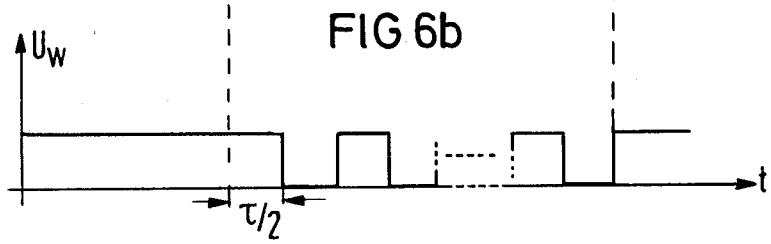

At the input 64 of the circuit, a time-dependent voltage $U_w$ is applied, as can be seen in FIG. 6b. At the time of the voltage drop, this voltage $U_w$ has the value $U_1$ as mentioned above. At the time $\tau/2$ after the voltage drop, the periodic pulse sequence 7' begins, as can be seen in particular from FIG. 6b. The pulse heights again amount to $U_1$; in comparison to the preceding examples, here these are only negative pulses.

The depiction of FIG. 6b also reproduces the optimum phase relationship between the input voltage $U_e$ (FIG. 6a) and the pulse sequence $U_w$, that is, between the sudden voltage drop 3 of the direct voltage triggering 1, according to the present invention, and the triggering alternating voltage 7'.

Although I have described my invention by reference to particular illustrated embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of exciting a piezoelectric transducer into sustained oscillation, comprising the steps of:
   prior to applying periodic voltage pulses having a period $\tau$,
   applying a single d.c. voltage pulse to the piezoelectric transducer with a leading edge effective to deflect the transducer to a predetermined deflection in one direction which is approximately equal to the maximum deflection during sustained oscillation and an abrupt trailing edge located within an interval $\Delta t < \tau/2$ effective to deflect the piezoelectric transducer in the opposite direction; and then
   applying the periodic voltage pulses at the time of maximum deflection in the opposite direction to place and maintain the piezoelectric transducer in sustained oscillation.

2. The method of claim 1, wherein the step of applying a single d.c. voltage pulse is further defined as:
   applying a d.c. saw-tooth voltage pulse with a rising leading edge and a sharp trailing edge.

3. The method of claim 2, wherein the step of applying a saw-tooth voltage pulse is further defined as:
   temporarily applying the saw-tooth voltage pulse with a maximum voltage value sufficient to deflect the transducer to substantially the amplitude of sustained operation and over a rising interval which is greater than the period of the periodic voltage.

4. A method of exciting a piezoelectric transducer into sustained oscillation, comprising the steps of:
   prior to applying periodic voltage pulses having a period $\tau$, applying a single d.c. saw-tooth voltage pulse to the piezoelectric transducer with a leading edge effective to deflect the transducer to a predetermined deflection in one direction which is approximately equal to 70% of the maximum deflection during sustained oscillation and an abrupt trailing edge located within an interval $\Delta t < \tau/2$ effective to deflect the piezoelectric transducer in the opposite direction; and then
   applying the periodic voltage pulses at the time of maximum deflection in the opposite direction to place and maintain the piezoelectric transducer in sustained oscillation.

5. The method of claim 1, wherein:
   the duration $\theta$ of the rise of the d.c. voltage amounts approximately to $\theta = Q_m \cdot \tau$, where $Q_m$ is the mechanical Q value of the transducer and $\tau$ is the period of self resonance.

6. The method of claim 1, wherein the step of applying periodic voltage pulses is further defined as:
   applying a square-wave voltage, constituting the pulses, having a period $\tau$ at a time of substantially $\tau/2$ after the occurrence of the abrupt opposite direction of the d.c. voltage pulse and at a pulse amplitude such as to provide maximum deflection of the transducer in steady-state operation.

7. A method of exciting a piezoelectric transducer into sustained oscillation, comprising the steps of:
   prior to applying periodic voltage pulses having a period $\tau$,
   applying a single d.c. voltage pulse to the piezoelectric transducer with an amplitude effective to deflect the transducer to a perdetermined deflection in one direction which is approximately equal to 70% of the maximum deflection during sustained oscillation, a pulse width of approximately $\tau/2$, and an abrupt trailing edge located within an interval $\Delta t < \tau/2$ effective to deflect the piezoelectric transducer in the opposite direction; and then
   applying the periodic voltage pulses at the time of maximum deflection in the opposite direction to place and maintain the piezoelectric transducer in sustained oscillation.

8. A circuit arrangement comprising:
   a piezoelectric transducer;
   an electronic switch;
   a transformer including a primary winding connected in series with said electronic switch and to an operating potential and a secondary winding connected to said transducer; and
   triggering means connected to said switch for applying a triggering signal including a single first input signal pulse having a rising edge, a predetermined amplitude and a rapidly-dropping edge, and a second input signal of a series of following pulses all of substantially the same predetermined amplitude to said electronic switch to trigger the same;
   said first signal pulse having a pulse duration of $\theta \approx Q_m \cdot \tau$, where $Q_m$ is the mechanical Q of the transducer and $\tau$ is the period of the second input signal pulses.

* * * * *